C. W. HALL.
AEROPLANE.
APPLICATION FILED OCT. 24, 1917.
1,431,520.
Patented Oct. 10, 1922.
5 SHEETS—SHEET 1.
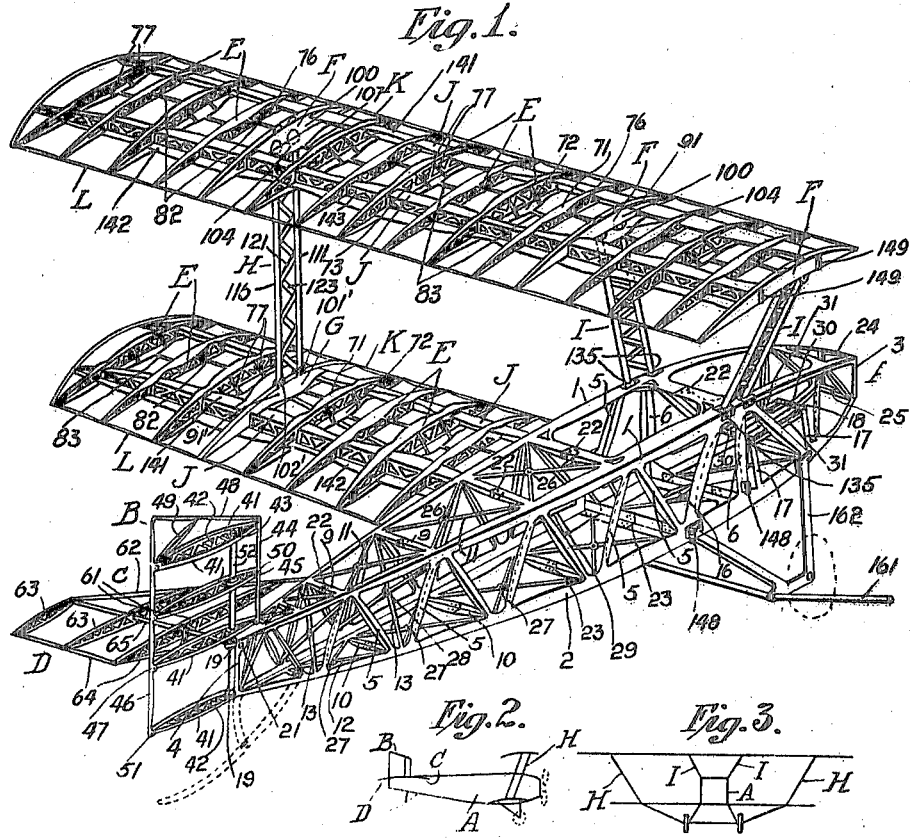
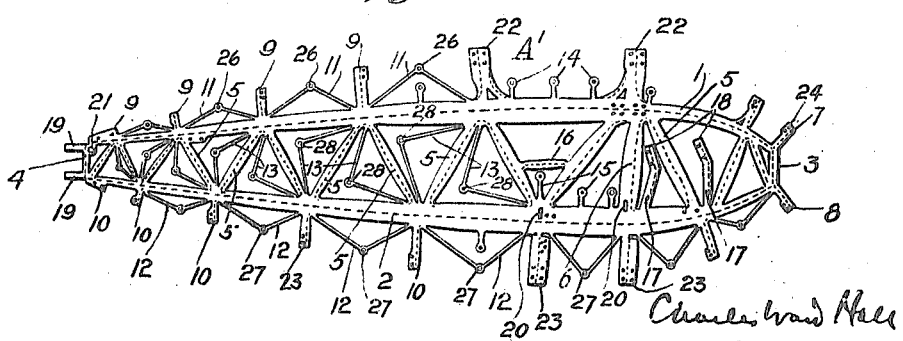
INVENTOR.
ATTORNEY C. W. HALL.
AEROPLANE.
APPLICATION FILED OCT. 24, 1917.
1,431,520.
Patented Oct. 10, 1922.
5 SHEETS—SHEET 2.
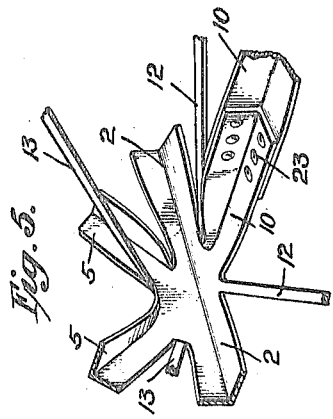
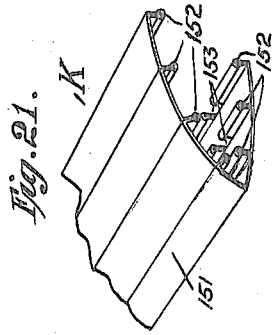
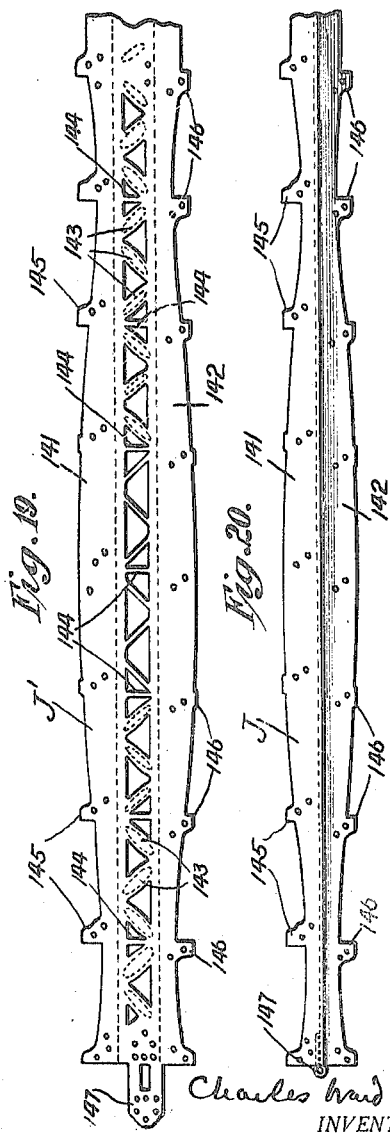

C. W. HALL.
AEROPLANE.
APPLICATION FILED OCT. 24, 1917.
1,431,520.
Patented Oct. 10, 1922.
5 SHEETS—SHEET 3.
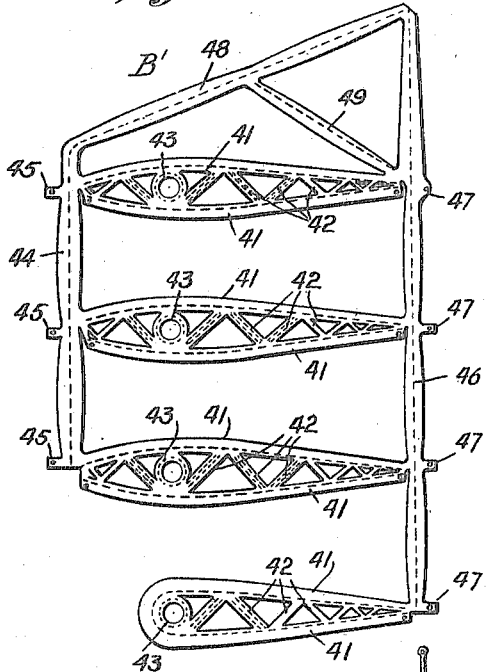
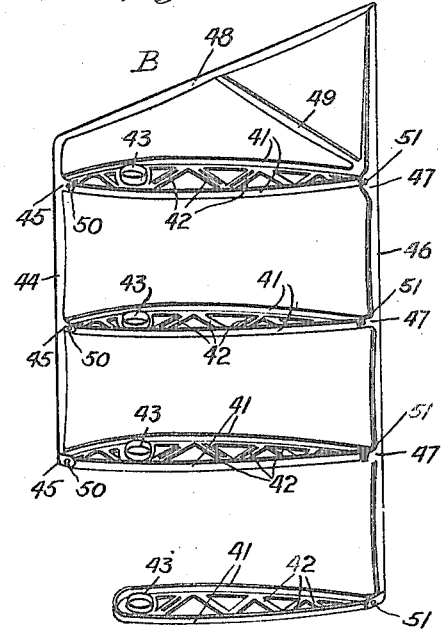
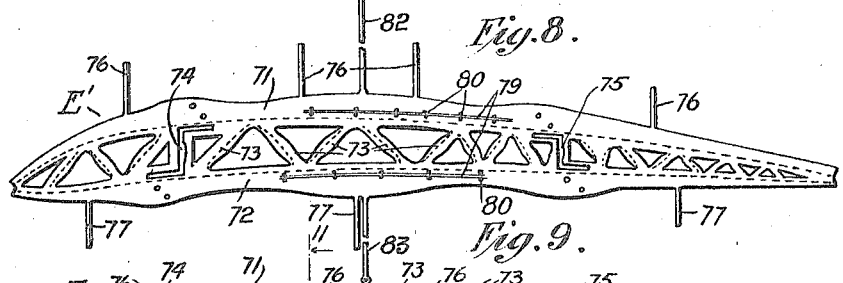
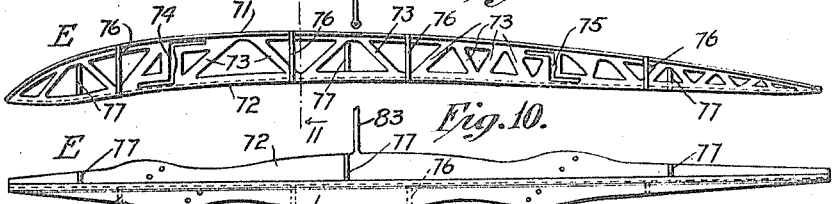
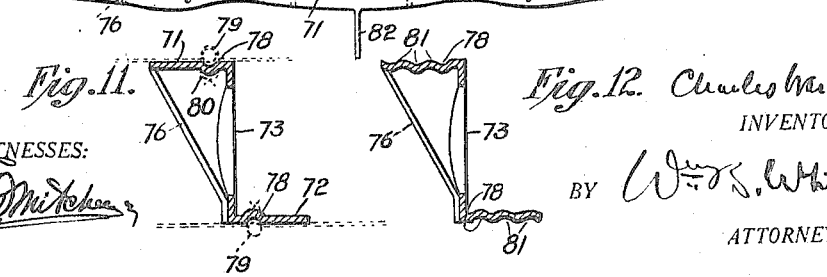
Charles Ward Hall
INVENTOR.
BY Wm. S. Whitney
ATTORNEY
WITNESSES:

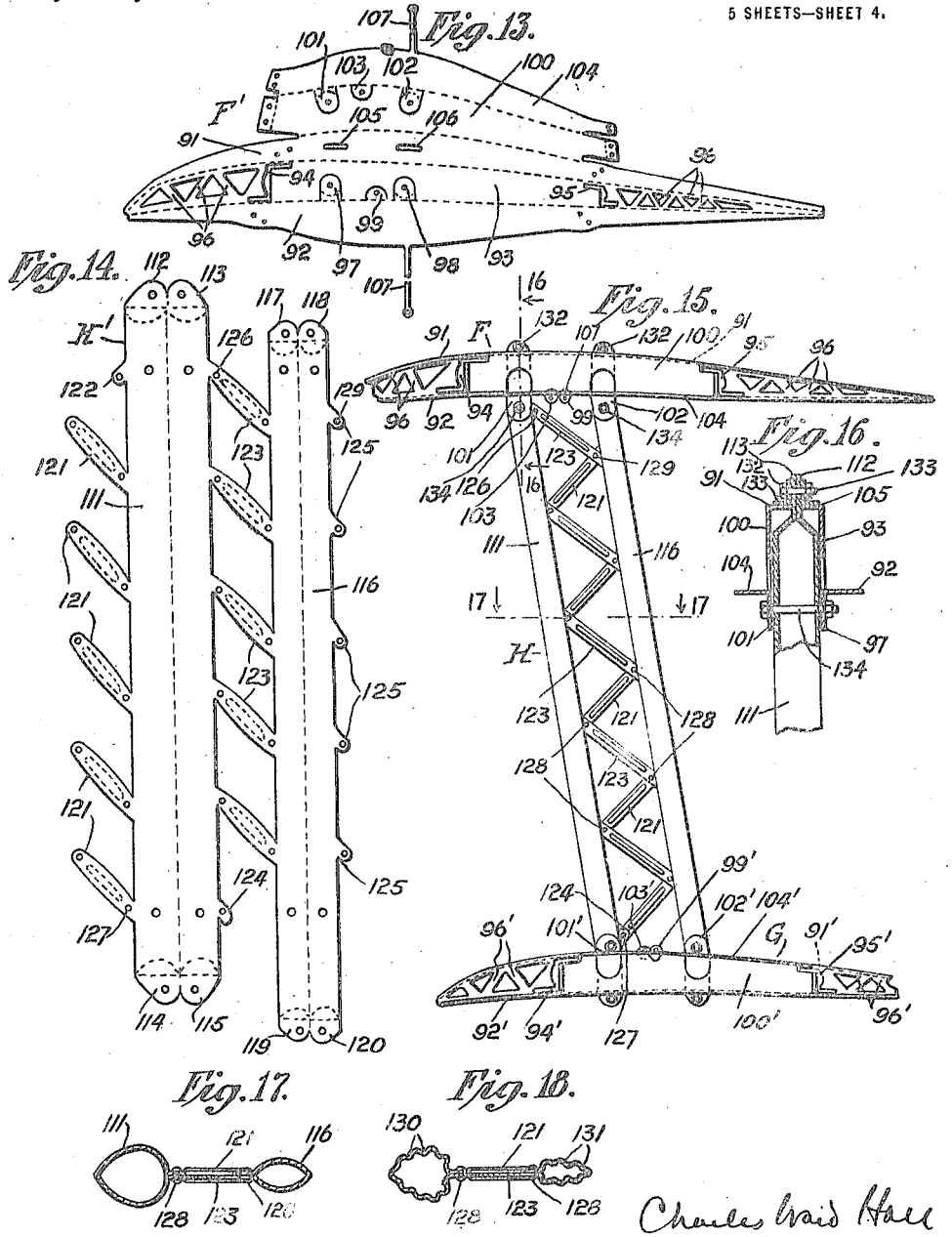

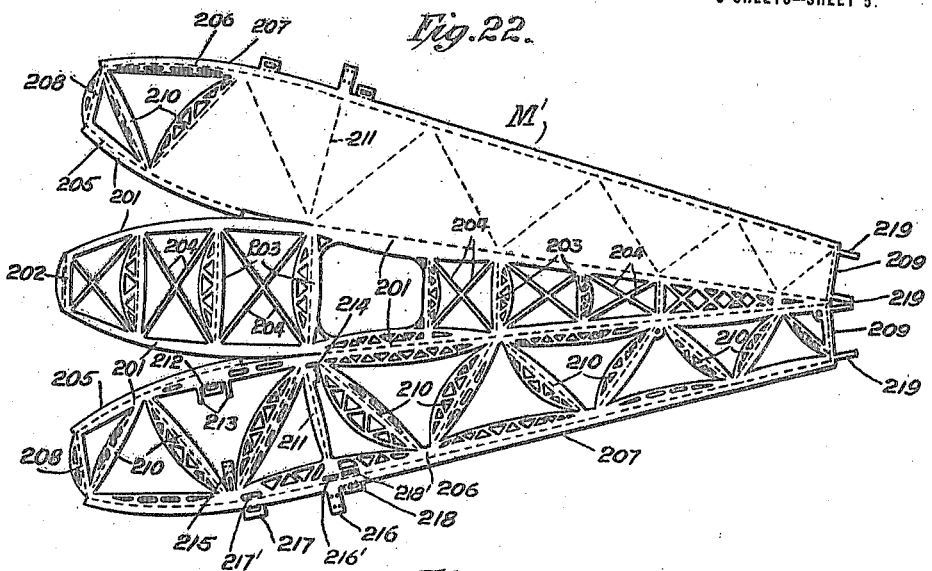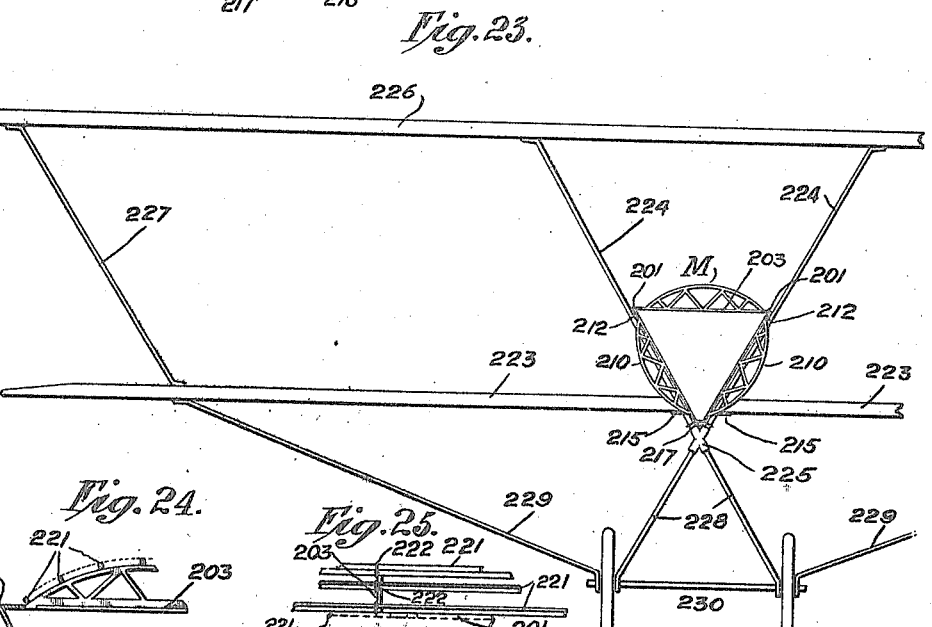

Patented Oct. 10, 1922.

1,431,520

UNITED STATES PATENT OFFICE.

CHARLES WARD HALL, OF LARCHMONT, NEW YORK.

AEROPLANE.

Application filed October 24, 1917. Serial No. 198,209.

*To all whom it may concern:*

Be it known that I, CHARLES WARD HALL, a citizen of the United States, and a resident of Larchmont, in the county of Westchester and State of New York, have invented certain new and useful Improvements in Aeroplanes, of which the following is a specification.

My invention relates to aeroplanes, and, more specifically, to the framework of the body and other constituent parts of a flying machine.

The object of the invention is to provide a system of construction by which the framework of all the principal parts of a flying machine of standardized shapes capable of being readily assembled, may be stamped out in suitable dies from plates or sheets of metal so that they may be turned out in large quantities, at low cost, and at the same time may possess a maximum of strength combined with a minimum weight.

With this end in view, my new system comprises a fuselage, wing spars and ribs, inter-wing struts, and frames for the control planes, all of a substantially similar trussed construction, each of which is made from a single blank, or, whenever necessary because of the shape or size of the part, in two or more sections, which is stamped from a plate of steel or other suitable material and is then bent to upset and stiffen the truss members subject to bending or compression stresses and to give to the part the required shape. The sections are united, to the limited extent necessary, and the parts on being assembled are secured together, by riveting, welding, or otherwise.

One of the many features of the complete system is that all the members which transmit stresses to a given point in each truss are integral at such point, thus developing the full strength of the members with a minimum weight of metal.

Another feature is that in each part the members are so disposed that the stresses to which they will be subject can be as readily and certainly computed as in a pin truss, and hence can be designed to adequately take such stresses.

A further feature is that in the various trusses the members which are subject to compression or to combined compression and bending stresses, are tapered to vary their cross-sectional area, by varying the width of the material whereas here each part is shaped up from a blank cut from a metal sheet of uniform thickness, both intrapanel and from panel to panel so as to give them at each point throughout their length a moment of resistance proportioned approximately to the stresses thereat.

A further feature is that in each part which is made from a blank cut from a plate of uniform thickness, the truss members which will be subject to compression or to combined compression and bending stresses are so tapered by varying their width as to give them at each point throughout their length a moment of resistance substantially proportioned to the stresses at that point.

A still further feature is that in the framework of the wings both the spars and the ribs, which are of unsymmetrical section, are so arranged and connected together that failure of one perpendicular to the axis of its least radius of gyration will be opposed and restrained by another perpendicular to the axis of a high radius of gyration—that is to say, failure of one spar in the direction perpendicular to its plane of least resistance will be opposed and restrained by another spar in a plane of high resistance and the similar failure of one rib will be similarly opposed and restrained by another rib—while a secondary type of failure of the spars will be so opposed and restrained by the ribs as to reduce or partially reverse the otherwise normal stresses in the ribs.

These and other features of my invention will appear from the description thereof, taken in connection with the accompanying drawings, in which—

Figure 1 is a perspective view of the framework of a biplane, with fuselage of substantially stream-line form and rectangular section, embodying in their preferred forms the different parts and illustrating most of the features of my invention, certain of the parts being broken away or omitted entirely to prevent confusion; Figs. 2 and 3, diagrammatic views, on a reduced scale, illustrating the machine in side and front elevation, respectively; Fig. 4, a side view of the blank for one-half of the rectangular fuselage; Fig. 5, an enlarged detail of a portion of the fuselage; Fig. 6, a side view, on an enlarged scale, of the blank for the framework of the rudder, and Fig. 7, a similar view of the rudder frame after the blank has been shaped up; Fig. 8, a side view of the blank for the wing ribs, and Figs. 9 and 10, a side elevation and plan, respectively, of a completed rib formed therefrom, Fig. 11, an enlarged section on the line 11 11 of Fig. 9, and Fig. 12, a similar section showing additional corrugations in the flanges of the rib; Figs. 13 and 14, side views of the blanks, respectively, for certain special wing ribs and inter-wing struts, Fig. 15, a side elevation of a rib and strut, and of a second similar rib, showing them as they appear when shaped up from their blanks and joined together, Figs. 16 and 17, enlarged sectional details on the lines 16—16 and 17—17, respectively, of Fig. 15, and Fig. 18, a section similar to that of Fig. 17 but showing corrugations in the main members of the strut; Fig. 19, a side view of the blank for a portion of one of the wing spars, and Fig. 20, a plan of a completed spar shaped up therefrom; Fig. 21, an enlarged perspective of a portion of a nose strip adapted to be attached to the front ends of the wing ribs to connect them together and more particularly to provide a stiffener and support for the cloth covering of the wing at its entering edge; Fig. 22, a side view of the blank, partially undeveloped, for an entire fuselage of substantially stream-line form and triangular section; Fig. 23, a sectional view of the triangular fuselage, showing means for attaching thereto the wing spars and the running gear; Figs. 24 and 25, enlarged broken details showing in cross section and side elevation, respectively, certain portions of the fuselage and, attached thereto, battens over which to stretch the cloth covering so as to give to the body when completed a substantially circular section.

The same reference numerals are used to indicate like parts throughout the figures of the drawings.

Referring first to the specific construction shown in Figs. 1–20, the blank A' (Fig. 4), for one-half of the fuselage A, provides, for the main truss members which are subject to compression or both compression and tension stresses, the upper and lower longitudinal chord members or longérons 1 and 2, connecting vertical nose and tail pieces 3 and 4, a series of diagonal struts 5—5 and an additional upright strut 6 which join the upper to the lower longéron and form the web members of a side of the fuselage, half upper and lower transverse nose-pieces 7 and 8, a series of half upper transverse struts 9—9 which, when joined each to the corresponding half struts of a second blank, connect together the two upper longérons and form the compression web members of the top of the fuselage, and a series of half lower transverse struts 10 10, to be similarly joined to those of the second blank to connect together the two lower longérons and form the compression web members of the bottom of the fuselage. The blank also provides, as additional web and tie members which will be stressed in tension only, similar series of half upper panel cross-ties 11 11, half lower panel cross-ties 12 12, and half interior transverse cross-ties 13 13. In addition, there are provided several short braces 14 14 integral with an edge of the upper longéron, several similar braces 15 15 integral with the lower longéron, a member 16 extending between two of the diagonal side struts, two members 17 17 integral with the upper edge of the lower longéron and having their outer ends 18 18 at an elbow angle to their inner ends, and two horizontal members 19 19 integral with the rear edge of the vertical tail piece, and there are two upright slots 20 20 in the upper half of the lower longéron and a round opening 21 in the angle between the rear end of the upper longéron and the vertical tail piece, all for purposes to be hereinafter explained.

After the blank has been formed, it is shaped up by bending it to an angle along the center both of the upper and of the lower longéron (indicated by dotted lines). The diagonal and upright side struts, the half upper and lower transverse struts, and the vertical and half transverse nose pieces, are all shaped up to angle sections, by bending a side thereof inwardly along the dotted lines, and the open hollow sections thus formed, as an essential to securing for them fixed end column conditions, are upset to bring them into axial alignment with the plane of their supports on the chord members and so avoid eccentric loading.

A second blank is bent in a similar manner but in an opposite direction to that in which the first blank has been bent, so that one will form the right and the other the left half of the fuselage.

The two blanks, thus shaped up, are united by riveting (as indicated), welding, or otherwise suitably joining together, the ends of their corresponding half transverse members (see Fig. 1), the upper struts at 22, the lower struts at 23, the upper and lower vertical nose pieces at 24 and 25, the upper panel cross-ties at 26, the lower panel cross-ties at 27, and the interior transverse cross-ties (omitted in Fig. 1, to prevent confusion), after bending them inwardly to a plane perpendicular to the sides of the fuselage, at 28. The ends of the braces 14 and 15, after the braces have been suitably bent over, are riveted or welded at 29 to the opposite edge of the longéron to which each is attached, these braces serving at the points where most needed to hold the two sides of the longérons at right angles and prevent their buckling. The horizontal member 16, its upper side bent inwardly to a right angle with its lower side, serves on each side of the fuselage as a support for one end of the pilot's seat. The two members 17 17, on each side, being first upset longitudinally along the dotted lines, are bent inwardly at the upper edge of the longéron until the elbow end 18 of each is horizontal and overlaps the elbow end of the corresponding member on the other side. The overlapping ends of the opposite members are joined at 30, and the front and rear members on each side are united at their elbow ends by separate angle irons 31, thus forming within the fuselage a raised bed-frame for an engine. Finally, the two horizontal extensions 19 19 of each blank are bent, those on one side overlapping those on the other, to form upper and lower cylindrical seats in which to set a rudder post 52, and their ends are riveted or welded together.

It will be observed that, in the fuselage thus formed, the four longérons are tapered from the center towards both ends by varying the width thereof, and that in each of the panels the edges both of the longérons and of the struts are curved outwardly so that these members are widest at the center of the panel and taper towards each end. Moreover, in the corners of the panels (see Fig. 5) the flanged longérons and struts, in the form of angle irons to be calculated as fixed end columns, and the ties, which radiate therefrom, are all integrally united one with another with curved intersecting edges which give to the longérons an increased width on each side of the panel points and provide the struts with taperingly widened fillet ends at their supports on the longérons.

The framework of the rudder B is formed from the blank B' (Figs. 1, 6, and 7), which provides four horizontal ribs, the lower rib shorter than the three others, each comprising two curved and tapering longitudinals or chord members 41, which come together at their two ends, and, intermediate these ends, diagonal web struts 42 and an annular piece 43, and a vertical nose piece 44 with projecting ears 45 opposite each rib which connects the forward ends of the three upper ribs, a vertical tail piece 46 with projecting ears 47 opposite each rib which connects the rear ends of all four ribs, an inclined upper edge piece 48 which connects the upper ends of the nose and tail pieces, and a diagonal brace 49, all curved outwardly between points of support, as shown. This blank is shaped up by bending its parts on the dotted lines, as indicated. Thus, the outer halves of the chord members of the ribs are bent over at right angles to form flanges, the inner edges of the annular pieces in the webs of the ribs are upset to form cylindrical bearings for the rudder post, the larger diagonal web struts are upset centrally to stiffen them, and each rib as a whole is twisted about, between the nose and tail pieces, until it stands in a plane perpendicular to the plane of the blank; and the front half of the nose piece, the upper half of the edge piece, the rear half of the tail piece, and one side or the other of the diagonal brace are all bent over to an acute or V angle, and each ear on the nose piece is riveted at 50 and each ear on the tail piece is riveted at 51 to the flanged chord member of the rib.

The rudder frame is mounted to rotate upon the rudder post 52, which is fixed in the upper and lower cylindrical seats provided therefor at the tail of the fuselage, as already described.

The frames of the two portions of the usual rear elevator planes (shown on one side only of the machine, in Fig. 1)—the triangular forward portion C, which is fixed to the side of the fuselage and consists of trussed ribs 61 and connecting edge pieces 62, and the rear portion D, which is hinged to the forward portion and likewise consists of trussed rib 63 and connecting edge pieces 64—are made each from a suitable blank (not shown) similar to the blank for the rudder frame and are shaped up therefrom in substantially the same way. The adjoining ends of the ribs of these two frames are provided with flanged cylindrical openings, like those in the ribs of the rudder frame, for a pivot rod 65, set in the round openings 21 at the tail of the fuselage and extending out on the opposite sides thereof, by which the rear movable portions are hinged to the forward fixed portions of the two planes.

The ordinary wing ribs E, which are all substantially alike, are formed from blanks E' (Figs. 8–12) providing upper and lower curved and tapering longitudinals or chord members 71 and 72, which meet at their two ends, and an intermediate or web portion which is cut out so as to form a series of diagonal tie-struts 73, with outwardly curved edges, and a forward reversed Z-shaped slot 74 and a rear Z-shaped slot 75, to receive the wing spars. These members are bent over at right angles along the dotted lines, the upper chord member to one side in about half and to the other side in the remainder of the ribs, to form a horizontal projecting flange which is braced against buckling by bending down the braces 76 and riveting or welding their ends to the lower chord member (see Fig. 11), and the lower chord member to the side opposite to that to which the upper chord member is bent, so as to give to the rib a substantially Z-shaped or reversed Z-shaped section, and this lower flange is similarly braced by bending up the braces 77 and securing their ends to the upper chord member. The flange both at the top and bottom of the rib is preferably corrugated so as to form in its outer surface a longitudinal groove 78, which both stiffens the flange and provides a seat for a rod 79 serving, when secured to the flange by suitable wire clips or lacings 80, as means for attaching to the rib the cloth covering of the wing (see Fig. 11). The flanges of the rib may be further stiffened by additional corrugations 81 (see Fig. 12), if desired. The half bracing members 82 and 83, integral with the edges of the upper and lower flanges, respectively, provide means for tying together the adjoining ribs, when assembled, midway between the two wing spars.

Four special ribs F, for the upper wings, are made from the blank F'. The blank provides upper and lower curved and tapering longitudinals or chord members 91 and 92 which meet at their two ends, an intermediate or web portion 93, and, integral with the upper chord member, an additional web portion 100 and lower longitudinal or chord member 104 both of which extend through the central portion only of the rib. The main web portion 93 is cut away to form forward reversed Z-shaped and rear Z-shaped slots 94 and 95 like those in the web portion of the ribs E, diagonal tie-struts 96 forward and to the rear of these slots, and between the slots to provide ears 97, 98 and 99; and the additional web portion 100 is cut to provide ears 101, 102, and 103. In the formation of this rib the blank is bent along the four dotted lines, into a form substantially of an inverted U section through the central portion (see Fig. 16) and of Z section at the two ends. Thus, the lower chord member is bent at right angles to one side forming a horizontally projecting flange, the upper chord member, which is provided with two slots 105 and 106, is bent at right angles to the other side, forming an oppositely projecting horizontal flange. The additional web portion 100 is bent downwardly at a right angle to a plane parallel to the plane of the main web portion, and the additional lower chord member 104 is bent out at a right angle to form a horizontally projecting flange. The several ears are bent around so as to extend downwardly substantially in the plane of the web portion from which each is taken. A half tie member 107 is formed integral with the outer edge of each of the lower flanges.

Two other special ribs G (Figs. 1 and 15), for the lower wings, are very similar to the ribs F and are shaped up in the same way from similar blanks (not shown). In these ribs, however, the additional web portion 100' and chord member 104' are integral with the lower chord member 92', so that the rib, when shaped up, is of U section, the slots corresponding to slots 105 and 106 being formed in the lower chord member and the ears being cut from the upper instead of the lower sides of the web portions so as to project upwardly above the rib.

The blank H' for the inter-wing struts H (Figs. 1 and 14–17) provides forward and rear main uprights or chord members 111 and 116, the former with ears 112 113 at its upper end and ears 114 115 at its lower end and the latter with similar ears 117 118 and 119 120 at its upper and lower ends, a series of diagonal tie-struts 121 121 and an ear 122 integral with the outer edge of one upright, a second series of diagonal tie-struts 123 connecting the two uprights and integral therewith, an ear 124 integral with the inner edge of the first upright, and a series of ears 125 125 integral with the outer edge of the second upright. The blank is shaped up by bending both uprights about their longitudinal axes into hollow columns so shaped as to give to the strut when covered a stream-line section (Fig. 17) and pinching their ends to flatten and bring together the ears thereon and by upsetting the struts longitudinally as indicated by the dotted lines; and this part of the framework is completed by riveting or otherwise securing the ear 122 to the upper end of the upper strut 123 at 126, the ear 124 to the lower end of the lower strut 121 at 127, the lower end of a strut 121 to the upper end of a strut 123 at 128, and the upper end of a strut 121 and the ear 125 to the lower end of a strut 123 at 129. The two uprights may be further stiffened by longitudinal corrugations 130 and 131 (Fig. 18), if desired.

This inter-wing strut serves to connect together, on each side of a machine, two of the special wing ribs. Its upper end, passed up between the web portions of an upper rib F, is secured to the rib by bolts 132 which bind flanged washers 133 133 to the ears of the forward upright above the slot 105 in the rib and similar washers to the ears of the rear upright above the slot 106 and by bolts 134 which are passed through the ears 97 and 101 of the rib and the sides of the forward upright and through the ears 98 and 102 and the sides of the rear upright. The lower end of the strut is secured in like manner to a lower wing rib G.

A similar but shorter inter-wing strut I (Fig. 1) is used to connect an upper wing rib F to the top of the fuselage on each side thereof. It is formed in the same way as the strut H from a blank (not shown) similar to the blank H', and its upper end is secured to a rib F in the manner already described. The ears on the lower ends of the two uprights, preferably larger than in the struts H, are flanged out at right angles to each other so as to fit the top and side of one of the upper longérons of the fuselage, to which they are bolted at 135.

The wing spars J (Figs. 1, 19, and 20)

are shaped up from the blank J', which provides upper and lower tapering longitudinals or chord members 141 and 142 and an intermediate web portion cut out to form diagonal and vertical tie-struts 143 and 144, by upsetting certain of the diagonal struts longitudinally, as indicated, and bending the chord members over at right angles, on the dotted lines, the upper chord member rearwardly for a front spar and forward for a rear spar and the lower chord member in the opposite direction, thus giving the spar a reversed Z or Z-shaped section, respectively, to fit the forward and rear slots in the web portion of the ribs. At each rib position ears 145 and 146 extend outwardly from the curved edges of the flanges of the upper and lower chord members to the same distance from the web so as to fill out the upper and lower arms of the slots in all of the ribs. A slotted ear 147, integral with one end of the web portion of the spar, is bent around and riveted back to the web, thus forming one-half of a hinge by means of which these ends of the forward and rear spars may be secured by pins, the lower wing spars to corresponding hinge members 148 which pass through the slots 20 in the two lower longérons of the fuselage and are riveted at their inner ends to the vertical flanges of two transverse struts and the upper wing spars to corresponding hinge members 149 formed from ears integral with the web portions at both ends of central forward and rear spar sections mounted above the fuselage between the inner-wing struts I.

Both the ribs and the spars are in effect continuous girders, with cantilever outer ends, and consequently the edges of the chord members are preferably curved outwardly both at and midway between their points of support, as shown, so as to proportion the moment of resistance at each point to the stresses thereat and thus reducing to a minimum the amount of metal and the weight.

The ribs are arranged upon the spars in such manner that the lower flange of one is opposite the lower flange of the adjoining rib on one side and its upper flange is opposite the upper flange of the rib adjoining on the other side. The flanges of the ribs are riveted or welded to the flanges of the spars and are tied together, intermediate the spars, by joining the ends of the half bracing members 82 and 83 which project therefrom. Thus, as will be seen, there is an inter-relation and mutual dependence between the spars and the ribs both of which are unsymmetrical in section. The two spars are so related to each other and tied together by the ribs, and the ribs are so related and tied together by the spars and intermediate tie members, that the failure of one spar or rib perpendicular to its plane of least resistance will be opposed and restrained by a second spar or rib, respectively, in a plane of high resistance. The ribs also serve to brace the flanges and webs of the spars at short intervals and thereby effectually restrain any tendency to secondary failure through the buckling of these parts, while the tendency of the spars when stressed to rotate about their axes of symmetry is in such direction as in normal flight to relieve or partially reverse the normal compression or tension stresses in the flanges of the ribs.

A nose strip K (Figs. 1 and 21) is provided by shaping to fit the upper and lower flanges of the ribs at their forward ends a strip of sheet metal 151 which has been stiffened by being folded to form inwardly projecting longitudinal ribs 152. The ribs are flattened or cut away at 153, at each rib position, to admit the forward ends of the ribs, to which the strip is attached. This strip may be bent and carried back along the outer end of each wing. A tail strip L (Fig. 1) is shaped up in a similar way, but need not be made so wide and usually does not require any stiffening ribs.

After the framework of the wings has been assembled and the inter-wing struts have been attached to the special ribs, the sections of the upper wing spars may be pinned together, the lower ends of the central inter-wing struts secured to the top of the fuselage, and the inner ends of the lower wing spars pinned to the hinge members on the opposite sides of the fuselage. The trussing of the wings is then completed by a bent strut member 161 which at each end is attached to a lower wing rib G in any suitable manner, and, beneath the fuselage, passes through and is fixed within holes provided therefor in two forked struts 162 (one only shown, in Fig. 1) bolted at the upper ends of its two arms to the lower longéron of the fuselage, one on each side of the machine, and inclined outwardly from the bottom thereof. These two struts, which may be cut out and shaped up from sheet metal, also serve as brackets in which to journal the axle of the wheels which provide the usual running gear of a flying machine.

In the modified form of fuselage illustrated in Figs. 22-25, the blank M' serves for the entire fuselage M. The middle portion of this blank, which is to provide the transversely horizontal top of the fuselage, is cut out to form on each side half of an upper longéron 201, a transverse nose-piece 202 connecting the forward ends of the two upper longérons, a series of transverse struts 203, and a series of panel cross-ties 204; and the two outside portions, which are to provide the inclined sides and bottom of the fuselage, are cut out to form each another half of an upper longéron with a flap extension 205 on the divided forward end of the longeron, a half of the single lower longeron 206 with a flap extension 207, a nose-piece 208 connecting an upper and the lower longerons at their forward ends, a tail-piece 209 connecting an upper and the lower longerons at their rear ends, a series of diagonal struts 210, and a single upright or nearly upright strut 211, and, in addition, an ear 212 and two braces 213 integral with the upper longeron, an ear 214 integral with the rear side of the strut 211, four ears 215, 216, 217, 218, integral with the lower longeron, and upper and lower projecting strips 219 219 integral with the tail-piece.

The sides of the longerons within each panel are preferably curved outwardly at the middle of the panel more than would be required to give them the necessary strength if solid and are lightened by being cut away to form an outer arched longitudinal or chord member and a series of diagonal tie-struts, thus obtaining a higher moment of resistance without increase of weight, and the outer side of the nose-pieces and one side of the transverse struts 203 and of the diagonal struts 210 are similarly curved and cut away.

The fuselage is formed by bending the two outer portions of the blank along the center of the undivided parts of the upper longerons (indicated by dotted lines) and at the same time curving inwardly the forward ends of all three portions of the blank until the flap extensions 207 (suitably bent on the dotted lines) overlap, the ears 216, 217, 218 on the inner flap passing through the slots 216′, 217′, 218′ in the opposite half of the lower longeron, and the divided forward parts of the upper longeron meet. Then the overlapping flap extensions 207 are riveted or otherwise secured together, the flap extensions 205 are folded over and riveted or welded to the horizontal halves of the upper longerons in the middle portion of the blank, and the two tail pieces are riveted together. The braces 213, which correspond to the braces 14 and 15 of the rectangular fuselage and serve a similar purpose, are bent over and attached at their outer ends to the opposite edge of each upper longeron. The curved and lightened sides of the nose-pieces and of the transverse and diagonal struts are bent outwardly at a right angle; and to their arched outer edges are secured by wire clips 222 a series of light longitudinal battens 221 over which to stretch the cloth covering of the body, thus giving to the completed body a stream-line form substantially circular or rounded in section. The extensions 219 219, corresponding to the extensions 19 19 of the rectangular fuselage, are similarly bent and secured together to form upper and lower cylindrical seats for a rudder post. The ears 215, bent outwardly to horizontal position, form brackets to which are bolted the inner ends of the forward spars 223 of the lower wings, and the horizontal ears 216 serve as brackets to which are bolted the inner ends of the rear spars (not shown) of these wings. The ears 212 and 217, bent to a right angle with the side of the fuselage, are provided with openings within which are secured two inter-wing struts 224, which at their lower ends are fastened together in a socket-piece 225 and at their upper ends are attached to and support the forward spar 226 of the upper wings, while the ears 214 (a strap, not shown, being riveted thereto to provide the opening) and 218 serve in like manner to support two inter-wing struts which support the rear upper wing spar (not shown). Other inter-wing struts 227 connect the outer ends of the upper and lower wing spars on each side of the machine; and the trussing of the wings is completed by rods 228, 229, 230, the latter serving as an axle for the wheels which constitute the running gear of the machine.

While I have shown and described what I now consider to be the best embodiments of my invention and its several features, it will of course be understood that these are merely illustrative and that the invention may be variously modified in its many details, within the scope of the appended claims, and that one or more of the features may be used without the others, without departing from the spirit or sacrificing the advantages thereof.

What I claim as new, and desire to secure by Letters Patent, is—

1. In an aeroplane, a system of sheet metal framework wherein the main component parts of the frame, including fuselage and wing spars and ribs, are of truss construction and all are shaped up from blanks cut from sheet metal and providing both the chord and principal web members of the trusses.

2. In an aeroplane, a system of sheet metal framework wherein the main component parts of the frame, including fuselage and wing spars and ribs, are of truss construction and all are shaped up from blanks cut from sheet metal into trusses having both chord and principal web members of angle cross section.

3. In an aeroplane, a system of sheet metal framework wherein the main component parts of the frame, including fuselage and wing spars and ribs, are of truss construction and all are shaped up from sheet metal blanks into trusses having integrally united chord and web members of angle cross section.

4. In an aeroplane, a system of sheet metal framework wherein the main component parts of the frame, including fuselage and wing spars and ribs, are of truss construction and all are shaped up from sheet metal blanks into trusses having web members of angle cross section integrally united with the chord members and so related thereto as to secure substantial axial loading.

5. In an aeroplane, a system of framework wherein the main component parts of the frame, comprising fuselage and wing spars and ribs, are shaped up from sheet metal blanks into trusses in which chord and diagonal web members of open hollow cross-section are integral at the panel points and form a series of triangles capable of accurate stress analysis.

6. In an aeroplane, a system of framework including as elements thereof a fuselage and wing spars and ribs of metallic truss construction in which chord and web members of open hollow cross-section are integral at the panel points and the web members are upset to bring their axes into the plane of their supports on the chord members to thereby avoid eccentric loading and secure an essential to fixed end column conditions.

7. In an aeroplane, a system of framework including as elements thereof a fuselage and wing spars and ribs of metallic truss construction in which chord members and diagonal web members form a series of triangles and the chord members have a composite taper giving them at different points in the truss length a cross-sectional area proportioned approximately to the stresses thereat.

8. In an aeroplane, a system of framework including as elements thereof a fuselage and wing spars and ribs of metallic truss construction in which chord members and diagonal web members form a series of triangles and both chord and principal web members have in different panels a different cross-sectional area giving them in the several panels moments of resistance proportioned approximately to the stresses therein.

9. In an aeroplane, a system of framework including as elements thereof a fuselage and wing spars and ribs of metallic truss construction in which chord and web members, of open hollow cross-section and integral at the panel points, are tapered to give them in the different panels an approximately uniform maximum fibre stress and the web members are upset to bring their axes into the plane of their supports on the chord members thereby avoid eccentric loading.

10. In an aircraft, a system of framework comprising a sheet metal truss having flanged chords integral with an open web in which the chords are reduced in weight by a gradual reduction in the width of their flanges between the points at and approximately midway between supports where they are most stressed.

11. In an aircraft, a system of framework comprising a metallic truss having chords and an open lattice web in which the weight of the truss is reduced by a gradual reduction in the cross-sectional area of the chords between the points at and approximately midway between supports where they are most stressed.

12. In an aircraft, a system of framework comprising a metallic truss with upper and lower chords of hollow cross-section and an intermediate web in which the chords by variations in their cross-sectional area are given an approximately uniform maximum fibre stress in the different panels and at different points in the same panel.

13. In an aircraft, a system of framework comprising a metallic truss in which chord and web members of hollow cross-section are integral at their intersections at the panel points and the chord members are given an approximately uniform maximum fibre stress in the different panels by variations in their cross-sectional area.

14. In an aircraft, a system of framework comprising a metallic truss in which chord and web members of hollow cross-section are integral at their intersections at the panel points and the chord and certain of the web members are by variations in cross-sectional area given an approximately uniform maximum fibre stress in the different panels.

15. In an aircraft, a system of framework comprising a truss made of homogeneous material in which the chord and web members of hollow cross-section are integral at their points of intersection and the web members are upset to bring their gravity axes into the plane of their supports on the chord members to avoid eccentric loading.

16. In an aircraft, a system of framework comprising a truss made of homogeneous material in which chord and web members of hollow cross-section are integral at their points of intersection and the web members, provided with taperingly widened fillet ends, are upset to bring their gravity axes into the plane of their supports on the chord members to avoid eccentric loading and so secure fixed end column conditions.

17. In an aircraft, a system of framework comprising a lattice truss made of homogeneous material in which chord members and web members of hollow cross-section are structurally combined to secure the substantial axial loading of the web members and by variations in cross-sectional area are given at different points in the length of the truss an approximately uniform maximum fibre stress.

18. In an aircraft, a system of framework comprising a lattice truss made of homogeneous material in which chord and web members are integral at the panel points and are shaped and structurally combined to secure substantially fixed end column conditions for the web members and continuous beam conditions for the chord members.

19. In an aircraft, a system of framework comprising a lattice truss made of homogeneous material in which chord and web members of open hollow cross-section are integral at their intersections at the panel points and the chord members have a compound taper giving them at different points in the truss length a cross-sectional area proportioned approximately to the stresses thereat.

20. In an aircraft, a system of framework comprising a lattice truss made of homogeneous material of uniform thickness in which chord and web members of open hollow cross-section are integral at their intersections at the panel points and the chord members are of a varying width and consequently varying cross-sectional area giving them at different points in the truss length moments of resistance proportioned approximately to the stresses thereat.

21. In an aircraft, a system of framework comprising a lattice truss made of homogeneous material in which chord and web members of open hollow cross-section are integral at their intersections at the panel points and the chord members are of a different cross-sectional area in different panels giving them in the several panels moments of resistance proportioned approximately to the stresses therein.

22. In an aircraft, a system of framework comprising a lattice truss made of homogeneous material in which flanged chord members and web members of open hollow cross-section are integral at their intersections at the panel points and are of a varying cross-sectional area giving them at different points in their length moments of resistance proportioned approximately to the stresses thereat.

23. In an aircraft, a system of framework comprising a lattice truss made of homogeneous material of uniform thickness in which flanged chord members and web members of open hollow cross-section are integral at their intersections at the panel points and are of a varying width and correspondingly varying cross-sectional area giving them at different points in their length moments of resistance proportioned approximately to the stresses thereat.

24. In an aircraft, a system of framework comprising a lattice truss made of homogeneous material of uniform thickness in which flanged chord members and web members of open hollow cross-section are integral at their intersections at the panel points and are of a varying width in the different panels giving them moments of resistance proportioned approximately to the stresses therein.

25. In an aircraft, a system of framework comprising a lattice truss made from sheet metal in which flanged chord members and web members of open hollow cross-section, offset to avoid eccentric loading, are integral at their intersections at the panel points and are of a varying width giving them in different panels moments of resistance proportioned approximately to the stresses therein.

26. In an aircraft, a system of framework comprising a lattice truss made from sheet metal in which flanged chord members and web members of open hollow cross-section with widened fillet ends integral with the chord members and offset to avoid eccentric loading are of a varying width giving them in different panels moments of resistance proportioned approximately to the stresses therein.

27. In an aircraft, a system of framework comprising a lattice truss made from sheet metal in which chord and web members are integral at their points of intersection and certain of the web members of open hollow cross-section act as fixed end columns and are tapered by varying their width to give them at different points in their length moments of resistance proportioned approximately to the stresses thereat.

28. An aircraft truss, comprising flanged chords of sheet metal and a connecting web, in which the outer edge of the chord flange is braced at intervals only and at points at which the chord is subject to compression, bending and like stresses.

29. A sheet metal aircraft truss, comprising flanged chords integral with a connecting web, in which the outer edge of the chord flange is braced at intervals only and at points at which the chord is subject to compression, bending and like stresses.

30. A sheet metal aircraft truss, comprising flanged chords and integral therewith a connecting lattice web with members of open hollow cross-section and brace pieces bracing the outer edge of the chord flanges at intervals only and at points at which they are subject to compression, bending and like stresses.

31. In an aircraft, a system of framework comprising a metallic spar, with upper and lower chords and a lattice web, which is tapered with reference to its points of support by gradually varying the cross-sectional area of its chords and giving them the greatest area both over and approximately midway between the points of support.

32. In an aircraft, a system of framework comprising a flanged spar with open web which is shaped up from a sheet metal blank and in which the flanges are of gradually changing width giving them their greatest area both over and approximately midway between the points of support of the spar.

33. In an aircraft, a system of framework comprising a flanged spar of substantially uniform depth which is tapered with respect to its points of support by varying the cross-sectional area of its flanges to give it at different points in its length moments of resistance proportioned approximately to the stresses thereat.

34. In an aircraft, a system of framework comprising a flanged spar of substantially uniform depth which is shaped up from a blank of sheet metal and is tapered with respect to its points of support by variations in the width of its flanges which give it at different points in its length moments of resistance proportioned approximately to the stresses thereat.

35. In an aircraft, a system of framework comprising a flanged spar of substantially uniform depth which is shaped up from a blank of sheet metal and is given moments of resistance varying at different points in its length by variations in the width of its flanges.

36. In an aircraft, a system of framework comprising a flanged spar of substantially uniform depth which is shaped up from a blank of sheet metal and in which the flanges are of gradually changing width and are provided at intervals with ears projecting outwardly to a uniform distance from the plane of the web.

37. In an aircraft, a system of framework comprising a spar of substantially Z-section which is shaped up from a blank of sheet metal.

38. In an aircraft, a system of framework comprising a sheet metal spar of substantially Z-section which has an open lattice web and tapered flanges giving them a maximum width at and approximately midway between the points of support.

39. In an aircraft, a system of framework comprising a sheet metal rib with flanged chords and open lattice web in which the flanges are tapered to gradually reduce their width from a maximum at and approximately midway between the points of support of the rib.

40. In an aircraft, a system of framework comprising a sheet metal rib with flanged chords and lattice web in which the outer edges of the chords are braced at intervals.

41. In an aircraft, a system of framework comprising a sheet metal rib with flanged chords of a width gradually reduced from the points where they are most stressed and a lattice web with members of open hollow section.

42. In an aircraft, a system of framework comprising a rib of substantially Z-section with open lattice web which is shaped up from a blank of sheet metal.

43. In an aircraft, a system of framework comprising a sheet metal rib of substantially Z-section which has an open lattice web and tapered flanges giving them a maximum width at and approximately midway between the points of support.

44. In an aircraft, a system of framework comprising a sheet metal rib of substantially Z-section which has an open lattice web and tapered flanges braced at intervals along their edges.

45. In an aircraft, a system of framework comprising a plurality of trusses, with chord and web members, which are of unsymmetrical cross-sectional form and are structurally combined to reinforce, one in a plane of low resistance by another in a plane of higher resistance.

46. In an aircraft, a system of framework comprising a plurality of sheet metal trusses, with flanged chords and integral webs, which are unsymmetrical in cross-section and are structurally combined to reinforce one against failure perpendicular to its plane of least resistance by another in a plane of relatively high resistance.

47. In an aircraft, a system of framework comprising a plurality of parallel trusses which are shaped up to approximately Z-section from blanks of sheet metal and are structurally combined to reinforce each other by opposing a plane of high resistance in one to a plane of low resistance in another.

48. In an aircraft, a wing frame comprising two flanged spars of unsymmetrical section and a series of ribs in which the spars are arranged with their planes of least resistance oppositely inclined to the plane of the wing and are bonded together by the ribs.

49. In an aircraft, a wing frame comprising one or more spars and a series of integral flanged ribs of unsymmetrical section in which the ribs are bonded together with the planes of least resistance of adjoining ribs at opposite angles of inclination to the plane of the wing.

50. In an aircraft, a wing frame comprising flanged spars and a series of flanged ribs of unsymmetrical section in which spars and ribs are arranged with the planes of least resistance of the spars and of adjoining ribs at opposite angles of inclination to the plane of the wing and are bonded together the spars by the ribs and the ribs by the spars.

51. In an aircraft, a wing frame comprising integral flanged spars and ribs of sheet metal in which the spars are passed through slots in the ribs shaped to the section of the spars and spars and ribs are bonded together flange to flange to reinforce each other against failure by secondary stresses.

52. In an aircraft, a wing frame comprising flanged spars and ribs in which the buckling of the flanges of the spars is restrained both by the webs and the flanges of the ribs.

53. In an aircraft, a wing frame comprising spars and a series of ribs in which the ribs are shaped up from sheet metal alternately to a substantially Z and reversed Z-section and are bonded together by the spars.

54. In an aircraft, a wing frame comprising spars and ribs which are shaped up from sheet metal to substantially Z and reversed Z-section and are bonded together, the spars by ribs and ribs by spars, with the planes of least resistance of the spars and of adjoining ribs intersecting at a substantial angle.

55. In an aircraft, a wing frame comprising spars and ribs which are shaped up from sheet metal to substantially Z and reversed Z-sections, with open lattice webs and flanges tapered by varying the width thereof, and are structurally combined to reinforce one spar or rib against failure perpendicular to its plane of least resistance by another spar or rib in a plane of higher resistance.

56. In an aircraft, a system of framework comprising a strut which has main compression members provided with corrugations and a connecting lattice web and is made and shaped up from a blank of sheet metal.

57. In an aircraft, a system of framework comprising a sheet metal strut which has two closed hollow uprights connected by a series of diagonal web members integral therewith and in which the uprights are shaped to give to the strut as a whole when enclosed a substantially stream-line section.

58. In an aircraft, a system of framework comprising spars, ribs, and struts which are structurally connected the ribs to the spars and the struts to certain of the ribs and in which stresses are transmitted from the spars to the struts and vice versa through the ribs.

59. In an aircraft, a system of framework comprising two spars, ribs, and struts all of which are shaped up from sheet metal and are structurally connected the ribs to the spars and the struts to certain of the ribs between the spars.

60. In an aircraft, a system of framework comprising spars, ribs, and struts which are structurally connected the ribs to the spars and the struts to certain special ribs shaped up from sheet metal blanks and having upper and lower flanges and two vertical webs.

61. In an aircraft, a system of framework comprising spars, ribs, and struts which are structurally connected the ribs to the spars and the struts to certain of the ribs and in which the struts are of sheet metal with two compression members connected by a web and are attached to the ribs between two spars.

62. In an aircraft, a system of framework comprising spars, ribs, and struts in which the spars and struts are structurally connected through certain of the ribs and in which the ribs are of sheet metal of uniform thickness and have their parts shaped and proportioned in width to resist at predetermined strains the stresses transmitted through them and the struts are also of sheet metal and have two main compression members and a connecting web adapted to distribute eccentric stresses between the compression members and to reinforce each other against failure.

63. In an aircraft, a system of framework comprising sheet metal spars, ribs, and struts in which the spars and struts are structually connected through certain of the ribs and in which the struts have two main compression members of closed hollow section connected by a web and of a shape to give the struts as a whole when enclosed a substantially stream-line section.

64. In an aircraft, a system of framework comprising a plurality of wing frames and interwing struts in which each wing frame has two or more spars and connecting ribs and the interwing struts have a plurality of compression members of closed hollow section adapted through connecting webs to resist eccentric loading and connect together the wing frames through certain of the ribs.

65. In an aircraft, a system of framework comprising among other parts a plurality of wing spars, ribs connecting the spars, and tie-struts connected to certain of the ribs and to each other to form a complete truss system.

66. In an aircraft, a system of framework comprising a plurality of wing spars, ribs connecting the spars, a fuselage, brackets for running gear, and a series of strut-ties connecting certain of the ribs to each other and to the brackets and certain other ribs to the fuselage and forming through the inclusion of a series of triangles a complete truss adapted when the aircraft is in the air to distribute the entire weight thereof over the wings without the use of exposed wires.

67. In an aircraft, a system of framework comprising upper and lower wing frames, interwing struts, and a bent strut member in which the two wing frames are structurally connected near each end by an inwardly and downwardly inclined strut having front and rear compression members and a connecting web and the lower ends of the two struts are connected and braced together by the bent strut member.

68. In an airplane wing, in combination a trailing edge member, cross ribs secured in said member, and a leading edge member, said last mentioned member consisting only of a curved metallic plate secured to the front portion of said ribs, and extending a substantially greater extent over the upper surface of the wing than over the lower.

69. In apparatus of the class described, a leading edge member comprising a curved plate adapted to be securely fastened to the front ends of the cross ribs of an airplane wing and constituting with the cross ribs the sole support for the covering material at the front edge of an airplane wing, and formed to extend a substantial distance over the upper surface of an airplane wing, and only a short distance over the lower surface thereof.

70. In a device of the class described, a leading edge plate having a plurality of laterally extending ribs on its under surface.

71. In a device of the class described, a metallic leading edge plate having a flange at each of its laterally extending edges and a plurality of ribs on its under surface.

72. In a device of the class described, a metallic leading edge plate having a flange at each of its laterally extending edges and a plurality of ribs on its under surface, said plate having such a curvature as to fit over the front edge of the airplane wing.

73. In a device of the class described, a metallic leading edge plate having a plurality of ribs on its under surface, each rib being formed by crimping the metal on a straight line and then tightly forcing the sides of said crimped portion together to provide a smooth surface on the upper side.

74. In apparatus of the class described, a metallic leading edge plate having a plurality of ribs on its under surface, said plate being curved to fit the front edge of an airplane wing and adapted to be secured thereto with the said ribs resting against the nose webs of said wing.

75. In an aircraft, a metallic surfacing plate stiffened by a plurality of metallic ribs each comprising a web and a chord of closed hollow section.

76. In an aircraft, a metallic surfacing plate stiffened by a plurality of metallic ribs comprising a web and integral therewith a chord of closed hollow section.

77. In an aircraft, a metallic surfacing plate stiffened by a plurality of metallic ribs comprising a web integral with the plate and integral with the web a chord of closed hollow section.

CHARLES WARD HALL.